United States Patent [19]
Vilkaitis

[11] 3,946,343
[45] Mar. 23, 1976

[54] BENDABLE WAVE GUIDE

[75] Inventor: Hugo L. Vilkaitis, Thomaston, Conn.

[73] Assignee: Tech Systems Corporation, Thomaston, Conn.

[22] Filed: Feb. 11, 1974

[21] Appl. No.: 441,421

[52] U.S. Cl. .................. 333/95 A; 138/121; 138/173
[51] Int. Cl.$^2$ ........................ H01P 3/14; F16L 11/14
[58] Field of Search .......................... 333/95 A, 95 R; 138/121–122, 173

[56] References Cited

UNITED STATES PATENTS

| | | | |
|---|---|---|---|
| 3,101,744 | 8/1963 | Warnaka | 333/95 A |
| 3,186,438 | 6/1965 | Holmgren | 138/173 |
| 3,444,487 | 5/1969 | Krank et al. | 333/95 A |

FOREIGN PATENTS OR APPLICATIONS

| | | | |
|---|---|---|---|
| 303,856 | 12/1932 | Italy | 138/122 |
| 496,288 | 9/1953 | Canada | 333/95 A |

*Primary Examiner*—Alfred E. Smith
*Assistant Examiner*—Wm. H. Punter
*Attorney, Agent, or Firm*—Pennie & Edmonds

[57] ABSTRACT

A bendable wave guide comprising a bendable tubular section for the propagation of microwaves through the length of the section is disclosed. The bendable section is made of a highly conductive and ductile metal and, in the preferred embodiment, has a rectangular cross section. The bendable section has a smooth inner surface and an outer surface a portion of which is milled to have a series of transverse circular or spiral ridges and furrows along its length. When the wave guide is used, that area of the surface where the furrows are is deformed to accommodate bending, while the ridges maintain the rectangular cross section of the wave guide. A pair of coupling flanges are secured to the ends of the bendable section and allow the wave guide to be connected to a microwave unit.

3 Claims, 5 Drawing Figures

FIG. 1
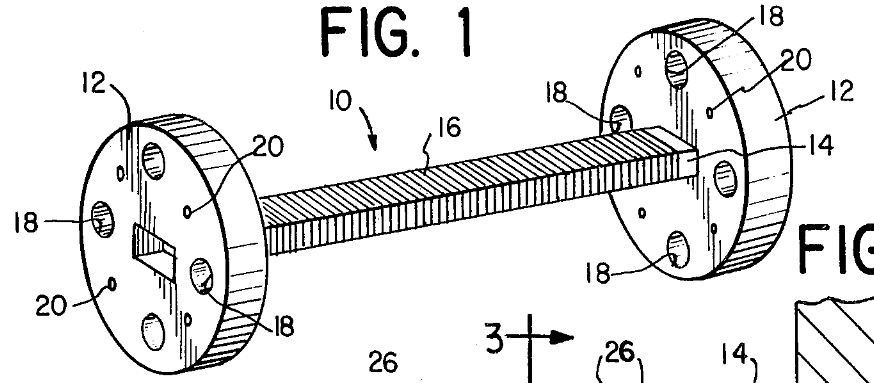
FIG. 2
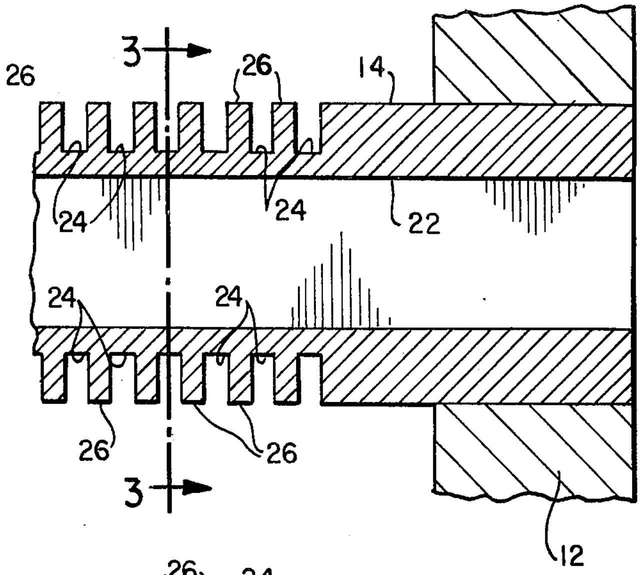
FIG.3
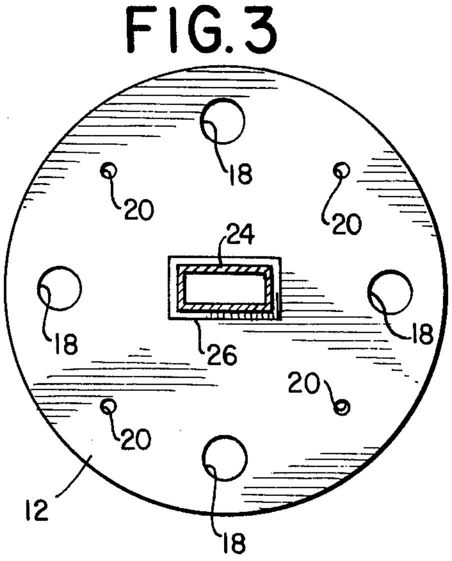
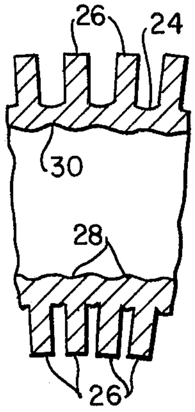
FIG. 4
FIG.5
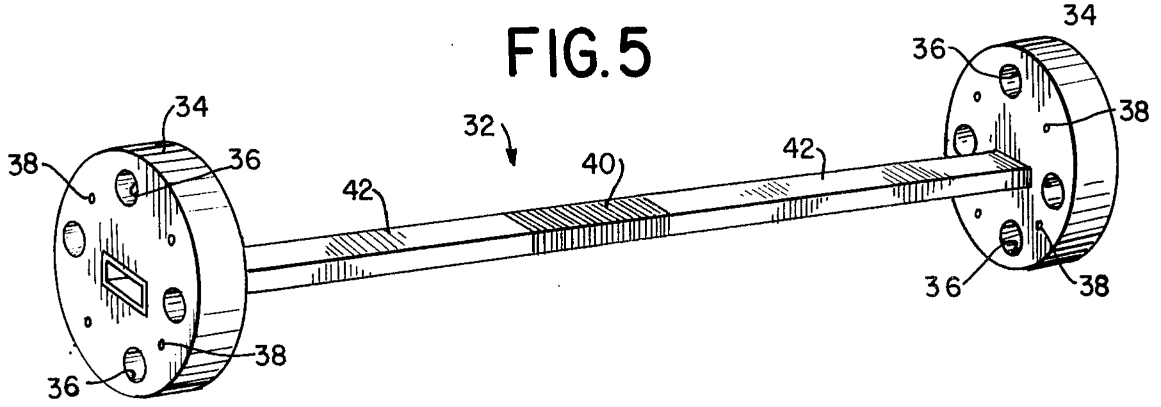

BENDABLE WAVE GUIDE

BACKGROUND OF THE INVENTION

The increasing utilization of microwave communication systems for the transmission of data has created a substantial need for a bendable wave guide exhibiting both low losses and uniform electrical characteristics in the millimeter microwave region. This need is especially acute in systems operating in the 20–150 GHz. range where space considerations or mechanical limitations do not always permit the transmission of microwave energy from one item of equipment to another along a straight line path.

A number of flexible wave guides are currently being used in the microwave industry. One of the commonly used prior art flexible wave guides is the interlocking type which is made by spirally winding a strip of metal whose edge portions are folded and compressed during winding to form a continuous interlocking structure. During flexure, the interlocking edges slide over each other, allowing the wave guide to assume the desired shape.

This particular type of wave guide can be made with any desired cross-sectional shape, but is usually formed with a rectangular cross section insofar as the polarization characteristics of this cross-sectional shape are the easiest with which to design. Although an interlocking wave guide fabricated in this manner works well at lower frequencies, the irregularities of its inner surface cause its performance to precipitously decline at higher frequencies.

In an attempt to improve upon this type of flexible wave guide, some wave guides have been designed which include an interlock configuration which does not permit sliding. At the same time, U-shaped convolutions or corrugations between the interlocks are provided. The corrugations expand open, compensating for the loss of flexibility caused by the inability of the interlock structure to slide. See, for example, U.S. Pat. No. 3,331,400. However, even this wave guide structure is unsuitable for use in the 20–150 GHz. range. The fabrication of the convoluted wave guide invariably results in a wave guide which includes large irregularities which cause unacceptable attenuation in the millimeter microwave region due to the impossibility of manufacturing a wave guide having small enough convolutions to operate efficiently in the higher frequency microwave regions.

SUMMARY OF THE INVENTION

In accordance with the present invention, an improved microwave wave guide which functions excellently in the millimeter wavelength region is provided. The wave guide preferably comprises a tubular section which is bendable over a portion of its length for the transmission of microwaves along its length. The inner surface of the bendable section is smooth while the outer surface is scored with a series of spiral or circular furrows which extend in a direction substantially transverse the length of the wave guide. The thickness of the bendable portion of the wave guide wall at the furrows is sufficiently thin to allow the easy manual bending of the section. In use, substantially all of the bending is achieved at the thin furrows portion of the tubular wall. Simultaneously, the cross-sectional shape of the device is maintained by the ridges which remain after these furrows have been cut into the outer surface. During bending, some irregularities are introduced into the inner surface of the wave guide. These irregularities generally conform to the furrows on the outer surface of the wave guide. In order to prevent unacceptable attenuation and reflections, it is necessary that there be at least a minimum number of furrows per wavelength for the highest frequency at which the wave guide will be used. A pair of suitable coupling flanges are soldered to the ends of the bendable section. In the preferred embodiment, the bendable section is made of any suitable material exhibiting high electrical conductivity and ductility, such as coin silver or oxygen-free copper.

The wave guide of the present invention can be fabricated by machining a metal tube having any of the conventional wave guide cross-sections, such as square, round or rectangular. In the preferred embodiment, a tube of rectangular cross section is used due to its advantageous polarization properties. The metal tube is milled with ridges until a quantity of metal sufficient to allow the facile bending of the tube has been removed. The tube should be of sufficient thickness that, after the milling has been done, the ridges which remain are strong enough to maintain the tube's cross-sectional shape during bending.

BRIEF DESCRIPTION OF THE DRAWINGS

FIG. 1 is a perspective view of a wave guide constructed in accordance with the present invention;

FIG. 2 is a cross-sectional view of the wave guide illustrated in FIG. 1;

FIG. 3 is a cross-sectional view along lines 3—3 of FIG. 2;

FIG. 4 is a cross-sectional view of a portion of the wave guide as illustrated in FIG. 4 during bending; and FIG. 5 is a perspective view of an alternative embodiment of the present invention.

DETAILED DESCRIPTION OF THE PREFERRED EMBODIMENTS

Referring to FIGS. 1–3, the wave guide comprises a bendable section 10 with a pair of coupling flanges 12 soldered to its ends. Bendable section 10 has an inside rectangular cross section with a height to width ratio of 1 to 2. Section 10 also includes flat portions 14 and a central bendable portion 16. The coupling flanges include large holes 18 for receiving mounting screws and small holes 20 for receiving line-up pins. The inner surface 22 of the wave guide is smooth. Furrows 24 are machined into the outer surface, leaving ridges 26. Support is provided by the ridges 26. Furrows 24 must be wide enough and thin enough to accommodate flexure. Similarly, ridges 26 must be wide enough and thick enough to provide the necessary support to maintain the cross-sectional shape of the wave guide during flexure. Typically, the thickness of the surface of bendable section 10 at the furrows is in the order of ⅝ the thickness of the bendable section at the ridges.

It is also desirable that there be at least 12 furrows per unit of wavelength in the wave guide for the highest frequency which the wave guide will carry. This is due to the fact that while bendable section 10 has a regular inner surface when the wave guide is not bent, bending will cause irregularities which may adversely affect the performance of the wave guide with respect to its standing wave ratio and other characteristics. These irregularities are illustrated in FIG. 4. Deformation during flexure of furrows 24 may take the form of either bellying 28 or thinning 30. This deformation results in the introduction of irregularities to the inner surface of bendable section 10. In order that these irregularities do not affect the transmission of microwaves through the wave guide, it is desirable to have at least a minimum number of furrows per unit wavelength along the length of the wave guide.

Experiments have shown that an acceptable degree of performance can be obtained when there are a minimum of 12 furrows for every wavelength in the wave guide along the length of bendable section 10 for the highest frequency that the wave guide will carry. Thus, for example, if the wavelength in the wave guide of the highest frequency signal for which the wave guide will be used is 1cm., then the number of furrows per unit length along the length of the wave guide would have to be at least 12 furrows per centimeter. Similarly, if the smallest wavelength to be used was 5mm., one would need 24 furrows per centimeter, and so forth. Of course, if a greater number of furrows are used, the performance of the wave guide will be better, if a fewer number are used, performance will be degraded.

A wave guide would typically have a rectangular cross section having a height and width in the order of ⅛ of an inch by ¼ of an inch and operate with microwaves having a wavelength in the order of 7.5 millimeters. The thickness of the tube selected for milling would be in the order of about 0.060 inches. Milling would remove 0.040 inches of the tube's thickness. This would result in a wave guide having a thickness of about 0.060 inches at the ridges 26 and about 0.020 inches at the furrows 24.

The wave guide may be fabricated by milling a metal tube of suitable cross section and thickness. Due to the polarization characteristics of wave guides which have an inner rectangular cross section with a height to width ratio of 1 to 2, a metal tube having these characteristics is most advantageously used. The metal of which the tube is made should be a good conductor of electricity and it should have sufficient ductility to permit easy bending. It is also important that the metal have a low elasticity and therefore have the property of remaining in the shape into which it is bent. Coin silver and oxygen-free copper have been found to fulfill these requirements. The thickness of the surface of the tube should be equal to the desired thickness of the final wave guide at ridges 26.

The wall thickness of the wave guide is not critical, but is usually in the order of 0.04 to 0.06 inches. The inner cross-sectional width of the wave guide should be substantially twice its inner cross-sectional height. Any wave guide with a given inner cross-sectional height and width is generally usable within a range of wavelengths. The following table shows the dimensions and useful operating range of a number of typical millimeter range wave guides constructed in accordance with the present invention.

| Recommended Operating Range for $TE_{10}$ Mode Wavelength in free space (cm.) | Outside Dimensions Width (inches) | Height (inches) | Tolerance (inches) | Thickness Nominal (inches) |
|---|---|---|---|---|
| 0.91–0.60 | 0.304 | 0.192 | ±.002 | 0.040 |
| 0.75–0.50 | 0.268 | 0.174 | ±.002 | 0.040 |
| 0.60–0.40 | 0.228 | 0.154 | ±.002 | 0.040 |
| 0.50–0.33 | 0.202 | 0.141 | ±.002 | 0.040 |

-continued

| Recommended Operating Range for $TE_{10}$ Mode Wavelength in free space (cm.) | Outside Dimensions Width (inches) | Height (inches) | Tolerance (inches) | Thickness Nominal (inches) |
|---|---|---|---|---|
| 0.40–0.27 | 0.180 | 0.130 | ±.002 | 0.040 |

As a general rule, for a wave guide operating in the millimeter region, given the wavelength in free space at the center frequency of a range having limits which are 20% above and below the center frequency, the inner cross-sectional width of the wave guide may be calculated using the formula:

$$w = 0.755\lambda$$

where $\lambda$ is the wavelength in centimeters and $w$ is the inner cross-sectional width of the wave guide in centimeters. As noted above, the inner cross-sectional height of the wave guide may be calculated by simply halving the inner cross-sectional width of the wave guide. Of course, the inner cross-sectional height of the wave guide may be varied, if one is not concerned with losses. Typically, the inner cross-sectional height of the wave guide may vary in size between 1 and ¼ the inner cross-sectional width of the wave guide. However, the inner cross-sectional width of the wave guide is critical and must be kept within the above-defined limits.

Furrows 24 are milled into the surface of the tube to form bendable main section 10 with furrows 24 and ridges 26. The metal may be removed using any one of a number of techniques. For example, a gang of rotary carbide saws may be used to mill the tube. Alternatively, the metal could be removed using an electromilling process. After the bendable section 10 has been milled, it is inserted into coupling flanges 12 which are soldered to its ends.

An alternative embodiment of the present invention is illustrated in FIG. 5. This wave guide is particularly useful in applications which require a wave guide that need bend only a relatively small amount while coupling the microwave signal over a relatively large distance. The wave guide comprises a bendable section 32 similar to that illustrated in FIG. 1. Coupling flanges 34 are soldered to bendable section 32 and include large holes 36 for receiving line-up pins. Microwaves are transmitted along the length of the bendable section 32 which includes a central bendable portion 40. Central bendable portion 40 is similar to the central bendable portion of the wave guide illustrated in FIG. 1 and is made by machining furrows into the surface of the wave guide.

Bendable section 32 also includes long flat portions 42 for the transmission of microwaves. Naturally, the length and position of bendable portion 40 and flat portions 42 may be varied to accommodate any particular intended use. For example, if the distance between the two units to be coupled together is very long, one would extend the length of flat portions 42. Similarly, if the amount of bending necessary for the particular application is relatively small, the length of central bendable portion 40 could be reduced. Alternatively, more than one bendable portion could be machined into the bendable section.

Thus, the wave guide illustrated in FIG. 5 is essentially identical to the wave guide illustrated in FIG. 1 with the exception that the lengths of the flat and bendable portions of the bendable section have been varied to accommodate a particular application requiring a greater transmission distance and less bending.

I claim:

1. A rectangular bendable wave guide for the transmission of microwave energy, said wave guide to be used in a range having a low limit frequency which is 20% below a center frequency and a high limit frequency 20% above said center frequency, the width of the inner cross section of the wave guide being defined by the formula:

$$w = 0.755\lambda$$

where $w$ is the inner cross-sectional width of the wave guide in centimeters and $\lambda$ is the wavelength in free space in centimeters of microwave energy at said center frequency, said wave guide comprising a bendable tubular member of rectangular cross section for the transmission of microwave energy therethrough, said bendable tubular member having electrical conductivity and ductility and having a smooth inner surface and an outer surface having ridges and furrows, said ridges and furrows entending substantially transverse the direction of propagation of microwave energy through said tubular member, said ridges being thick enough to maintain the cross-sectional shape of said bendable tubular member during flexure thereof, and said furrows being thin enough to allow said bendable tubular member to be bent, there being at least 12 furrows per wavelength in the wave guide along the length of said bendable tubular member for the high limit frequency of said range, and coupling means at each of the ends of said bendable tubular member for coupling each of said ends of said bendable tubular member to a microwave device.

2. A bendable wave guide as in claim 1, wherein the height of the cross section of the wave guide is half the width of the wave guide.

3. A bendable wave guide for the transmission of microwave energy within a range of frequencies defined between an upper limit frequency which is 20% above a center frequency and a lower limit frequency which is 20% below said center frequency, comprising a bendable tubular member of rectangular cross section for the transmission of microwave energy therethrough, at least one side of said rectangular cross section having an inner cross-sectional width defined by the formula:

$$w \cong 0.755\lambda$$

where $w$ is the inner cross-sectional width of the tubular member and $\lambda$ is the wavelength in free space of microwave energy at said center frequency, said bendable tubular member having electrical conductivity and ductility and having a smooth inner surface and an outer surface having ridges and furrows extending substantially transverse the direction of propagation of microwave energy through said tubular member, said tubular member having at least 12 furrows per wavelength in the wave guide for the frequency of said microwave energy along the length of said member, said ridges being sufficiently thick to maintain the cross-sectional shape of said bendable tubular member during bending thereof and said furrows being sufficiently thin to allow bending of the tubular member, the ratio of said thickness at said ridges to said thickness at said furrows being greater than 2 to 1, and coupling means at each of the ends of said bendable tubular member for coupling each of said ends of said bendable tubular member to a microwave device.

* * * * *